(12) United States Patent
Conklin et al.

(10) Patent No.: US 8,235,349 B1
(45) Date of Patent: Aug. 7, 2012

(54) CEILING DEVICE SYSTEM FOR SECURING OF DEVICES IN A CEILING

(75) Inventors: Ricky L. Conklin, Bellefonte, PA (US); Scott D. Thompson, State College, PA (US)

(73) Assignee: Oberon Inc., State College, PA (US)

( * ) Notice: Subject to any disclaimer, the term of this patent is extended or adjusted under 35 U.S.C. 154(b) by 1147 days.

(21) Appl. No.: 11/609,380

(22) Filed: Dec. 12, 2006

(51) Int. Cl.
*F16M 13/00* (2006.01)

(52) U.S. Cl. ............ 248/553; 248/551; 248/298.1; 70/163; 70/166; 109/50; 109/51

(58) Field of Classification Search .......... 248/551, 248/552, 553, 220.22, 220.21, 222.13, 224.8, 248/225.11, 317, 343, 298.1; 312/245, 246, 312/222, 215; 70/163, 166, 167, 168, 169, 70/DIG. 34, 58; 109/50, 51, 52
See application file for complete search history.

(56) References Cited

U.S. PATENT DOCUMENTS

| | | | | |
|---|---|---|---|---|
| 3,822,049 A | * | 7/1974 | Saunders | 248/223.41 |
| 3,993,278 A | * | 11/1976 | Race | 248/551 |
| 4,031,721 A | * | 6/1977 | Anderson | 70/58 |
| 4,047,686 A | * | 9/1977 | Porter | 248/552 |
| 4,083,620 A | * | 4/1978 | Burgin | 439/298 |
| 4,158,337 A | * | 6/1979 | Bahry et al. | 109/59 R |
| 4,325,531 A | * | 4/1982 | Omholt | 248/553 |
| 4,479,688 A | * | 10/1984 | Jennings | 200/43.02 |
| 4,584,856 A | * | 4/1986 | Petersdorff et al. | 70/57 |
| 4,669,281 A | * | 6/1987 | Young | 70/57 |
| 4,709,897 A | * | 12/1987 | Mooney | 248/551 |
| 5,250,767 A | * | 10/1993 | Sammon | 200/43.08 |
| 5,255,811 A | * | 10/1993 | Simon | 119/265 |
| 5,452,139 A | * | 9/1995 | Schrott | 359/871 |
| 5,465,927 A | * | 11/1995 | Chun-Jung | 248/271 |
| 5,588,631 A | * | 12/1996 | Yee | 248/553 |
| 5,683,122 A | * | 11/1997 | Lee | 292/39 |
| 5,692,722 A | * | 12/1997 | Lundag.ang.rds | 248/553 |
| 5,970,756 A | * | 10/1999 | Miller et al. | 70/168 |

* cited by examiner

*Primary Examiner* — Kimberly Wood
(74) *Attorney, Agent, or Firm* — John J. Elnitski, Jr.

(57) ABSTRACT

A ceiling device system for securing a device in a ceiling. The ceiling device system includes a cover plate to simulate a ceiling and has a device opening to receive the device. The ceiling device system includes a sliding mechanism mounted on an inside surface of the cover plate. The sliding mechanism includes a sliding component which moves within an area about the device opening. The ceiling device system includes a lock mechanism connected to the sliding component. The lock mechanism connected such that movement of the lock mechanism moves the sliding component. The ceiling device system includes a device mounting plate with slide tabs to engage the device and mounted to the sliding component of the sliding mechanism. The slide tabs are shaped to slide within the device to lock the device in the device opening of the cover plate due to movement of the sliding component.

22 Claims, 22 Drawing Sheets

CEILING DEVICE SYSTEM FOR SECURING OF DEVICES IN A CEILING

BACKGROUND

The present invention generally relates to the use of electronic devices mounted in ceilings for wireless communication. More specifically, the present invention relates to an apparatus that mounts in a ceiling and secures an electronic device within the ceiling.

Commonly, the wireless equipment such as an access point or telemetry gateway is mounted on a desk top, attached to a wall, suspended from an acoustical tile ceiling gridwork, or placed above the acoustical tile ceiling. These methods of mounting do not physically secure the equipment, and do not provide for ease of installation and maintenance. Since the wireless equipment commonly has an antenna, the equipment must be mounted in such a way that the equipment and antenna is exposed to the room, so that the radio frequency may propagate into the room to be covered by the equipment. Such wireless equipment has become very popular for computer networking in schools, factories, public buildings and office buildings. A main part of a wireless system for a computer network is an access point. The access point is the unit which communicates directly with wireless devices carried by users. Access points are usually mounted in the ceilings of buildings to avoid the ugly look of the wires required to be hooked to the access point. The access point is an expensive piece of equipment which can be easily stolen from the ceiling of a building. Access points can be a variety of shapes and sizes, which depends on the manufacturer of the access point. The different shapes and sizes presents a problem to finding a way to universally secure an access point in the ceiling.

It is an object of the present invention to provide an apparatus that provides for secure mounting of an access point in a ceiling, as well as other devices which could be mounted in a ceiling.

SUMMARY OF THE INVENTION

A ceiling device system for securing a device in a ceiling. The ceiling device system includes a cover plate to simulate a ceiling and is adapted to be installed in a ceiling, the cover plate including a device opening adapted to receive the device, the cover plate having an outside surface and an inside surface. The ceiling device system includes a sliding mechanism mounted on the inside surface of the cover plate, the sliding mechanism including a sliding component which is allowed to move within an area about the device opening of the cover plate. The ceiling device system includes a lock mechanism connected to the sliding component, the lock mechanism connected such that movement of the lock mechanism moves the sliding component within the area about the device opening of the cover plate. The ceiling device system includes a device mounting plate with slide tabs adapted to engage the device and mounted to the sliding component of the sliding mechanism, the slide tabs being shaped and adapted to slide within the device to lock the device in the device opening of the cover plate due to movement of the sliding component of the sliding mechanism.

DETAILED DESCRIPTION

Figure 1:
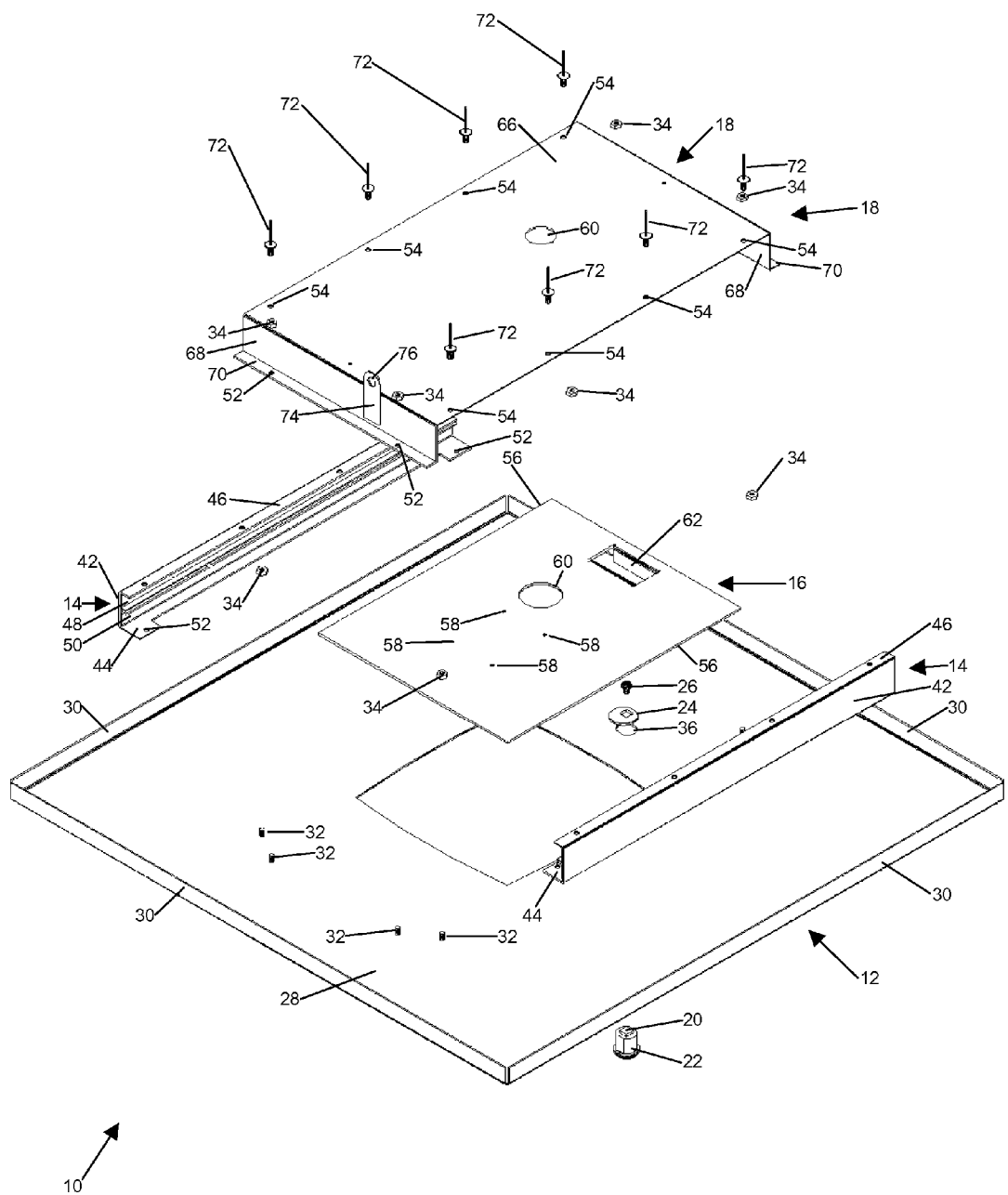
FIG. 1 is an exploded perspective view of components of a ceiling device system according to the present invention.
Figure 2:
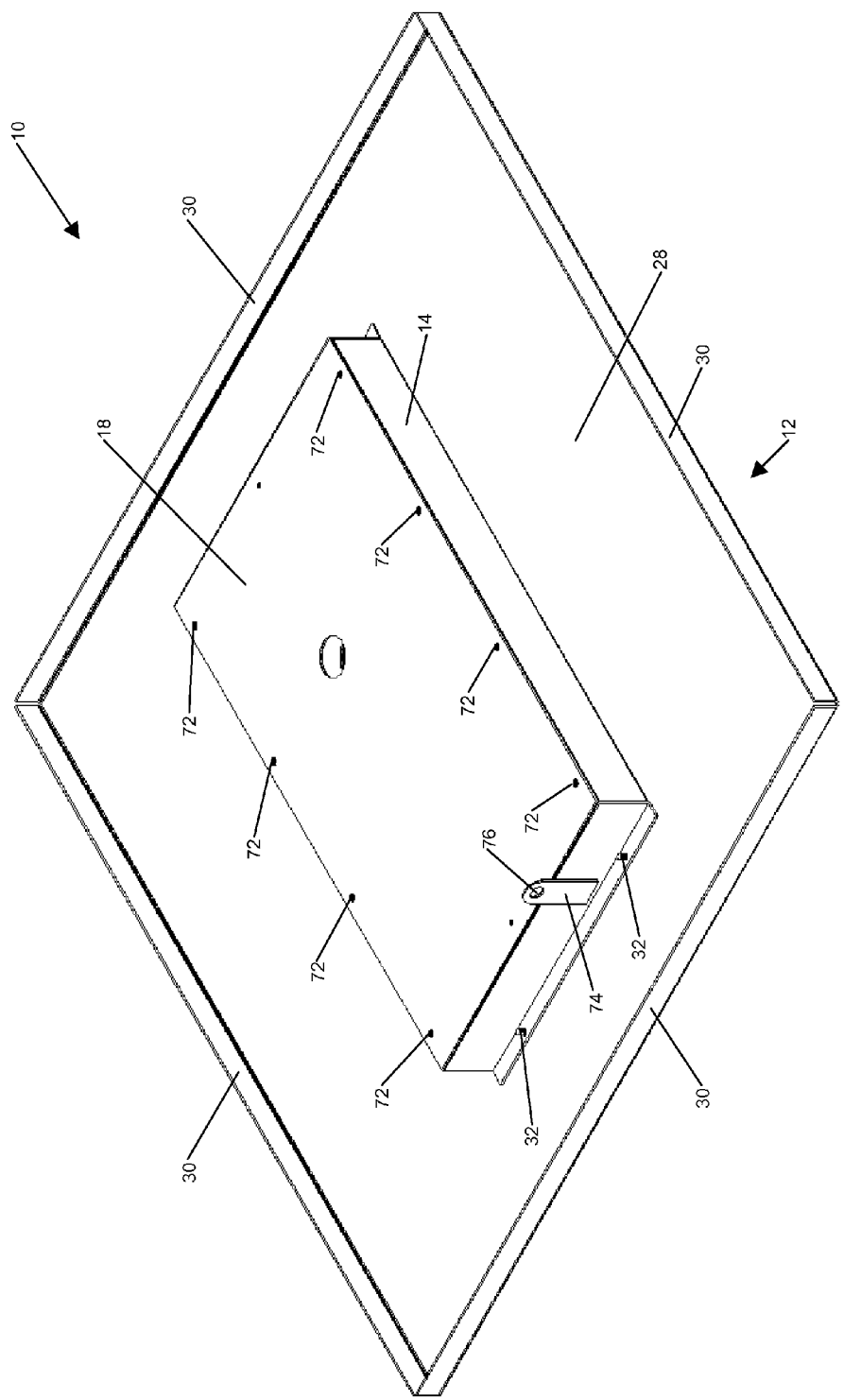
FIG. 2 is a perspective view of components of a ceiling device system according to the present invention.
Figure 3:
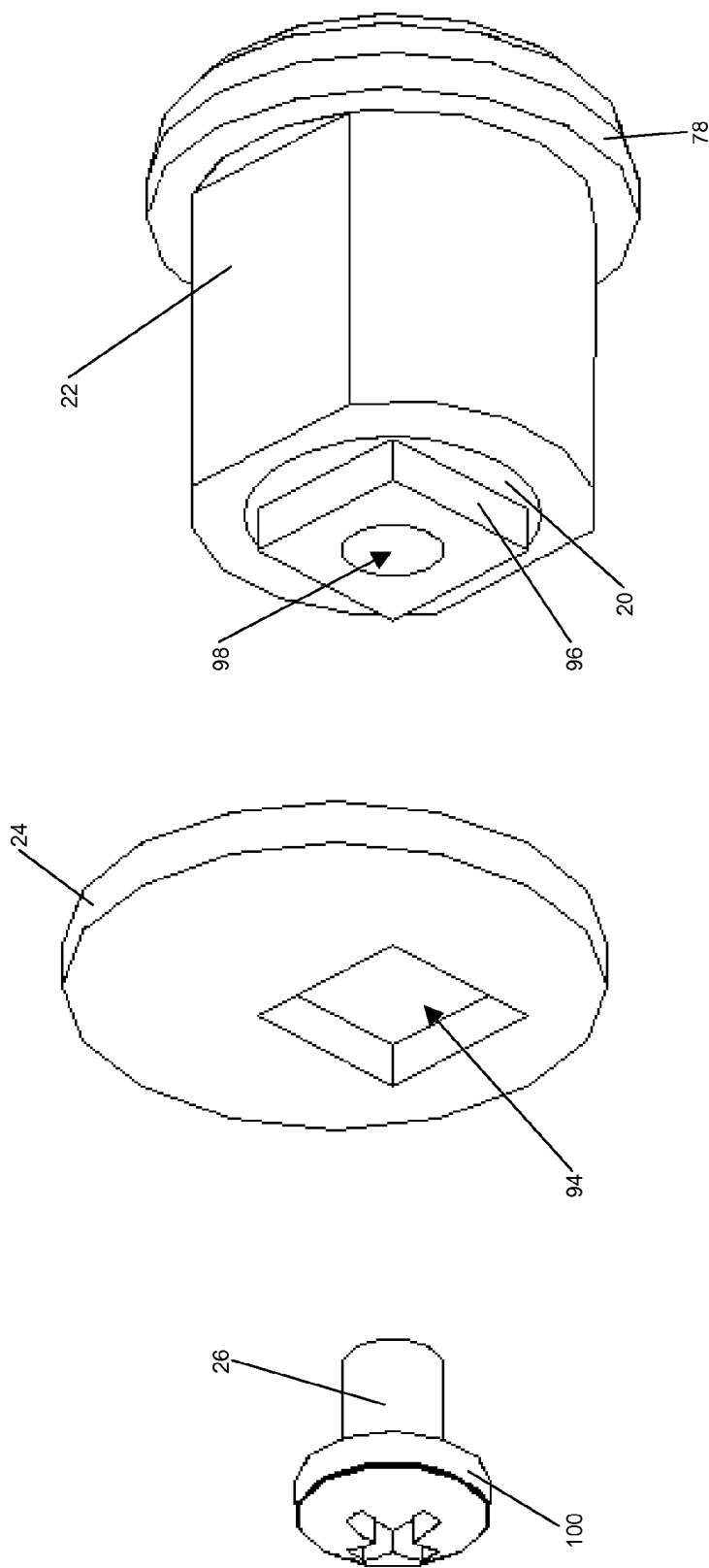
FIG. 3 is a perspective view of a lock mechanism according to the present invention.
Figure 4:
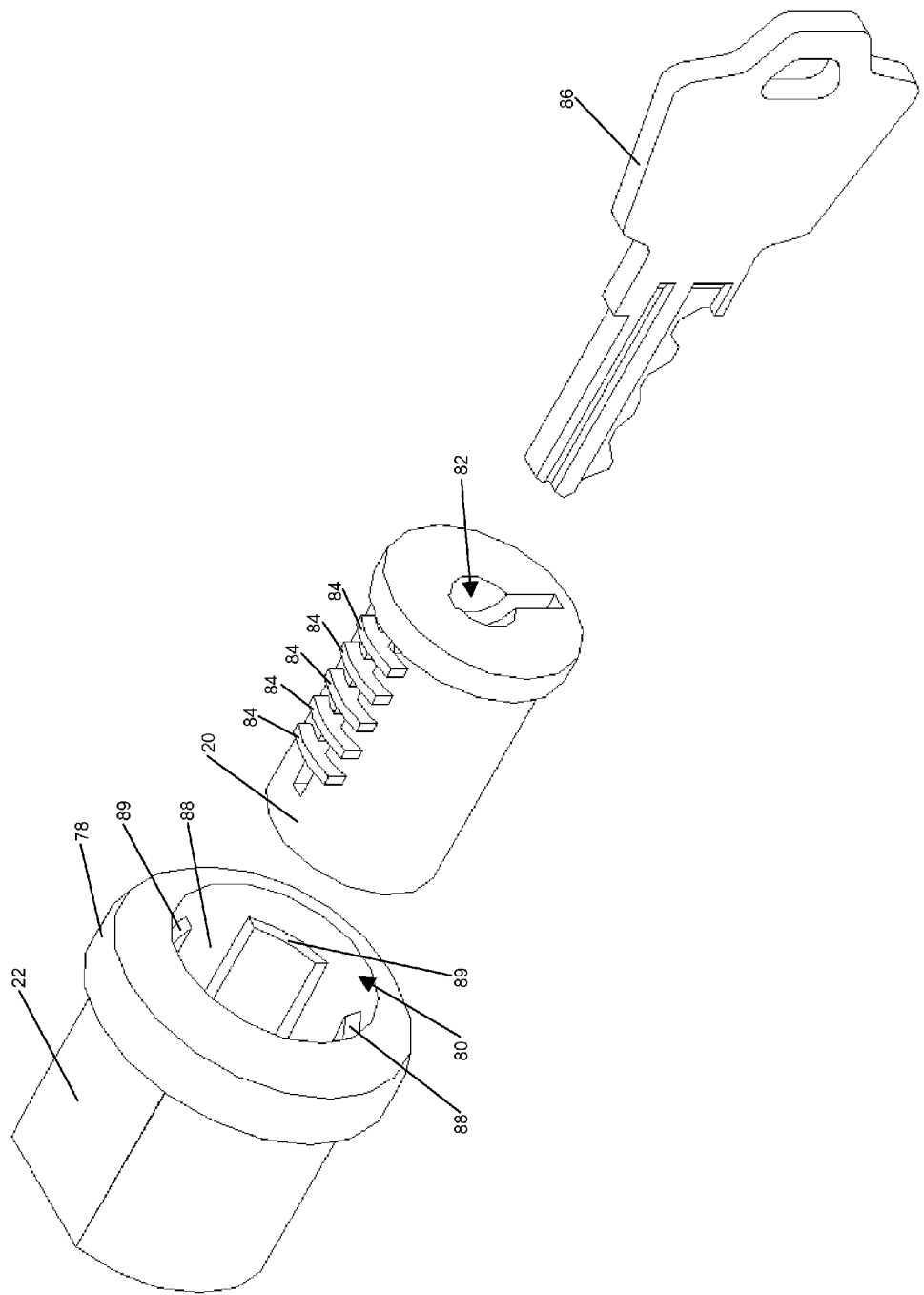
FIG. 4 is a perspective view of a lock mechanism according to the present invention.

The present invention is a ceiling device system to secure a device within a ceiling of a building, as shown in FIGS. 1-15. FIG. 1 shows an exploded view of the ceiling device system 10 and FIG. 2 shows an assembled view of the ceiling device system 10. The components of the ceiling device system 10 shown in FIG. 1 include a cover plate 12, a sliding mechanism and a locking mechanism. The sliding mechanism includes two side rails 14, a sliding mount plate 16 and a secure cover 18. The locking mechanism includes a lock cylinder 20, body 22, cam plate 24 and cam screw 26. FIG. 3 shows a close up of the body 22, cam plate 24 and cam screw 26. FIG. 4 shows the lock cylinder 20 removed from the body 22.

The cover plate 12 is usually sized and shaped to be a replacement for a ceiling tile for a suspended ceiling system, but can be sized and shaped to simulate other types of ceilings. The cover plate 12 in FIG. 1 is shown as a square, but could be any shape, depending on the shape of the ceiling tiles used in the suspended ceiling system. Generally, suspended ceiling systems use a grid of supports which hold tiles within the supports. The cover plate 12 of FIG. 1 is shown from the inside surface 28 which faces up toward the roof of a building, when installed into a suspended ceiling system. The cover plate 12 is shown with sides 30 extending upward from the inside surface 28. The cover plate 12 can be secured in one of the open grids of a suspended ceiling system in a number of known methods, so that the cover plate 12 can not be removed without getting in between the roof and the suspended ceiling and using tools for the removal of the cover plate 12 from the grid. The sides 30 of the cover plate 12 can be used as part of the means of securing the cover plate 12 in the open grid. The cover plate 12 includes cover plate studs 32 extending upward from the inside surface 28 to secure the side rails 14 and the secure cover 18. The cover plate studs 32 are threaded to receive nuts 34. The cover plate 12 includes a lock hole 36 to receive the body 22. The cover plate 12 includes a device opening 38 to receive the device 40 to be mounted and secured in the ceiling by the ceiling device system 10.

The side rails 14 each include a side 42, bottom flange 44, top flange 46, upper slide guide 48 and lower slide guide 50. The bottom flange 44 extends from the side 42 and includes stud mounting holes 52. The top flange 46 extends from the side 42 and includes rivet holes 54. The upper slide guide 48 and lower slide guide 50 extend from the side 42 between the top flange 46 and bottom flange 44 and are parallel to each other. The upper slide guide 48 and lower slide guide 50 are spaced apart just enough to allow the sliding mount plate 16 to slide between the upper slide guide 48 and lower slide guide 50. The side rails 14 are mounted to the inside surface 28 of the cover plate 12 by placing stud mounting holes 52 of the bottom flanges 44 of the side rails 14 over some of the cover plate studs 32. The nuts 34 are then threaded over the cover plate studs 32 to secure the side rails 14 to the inside surface 28 of the cover plate 12.

The sliding mount plate 16 includes two slide edges 56 which fit between the upper slide guide 48 and lower slide guide 50 of each side rail 14. The sliding mount plate 16 is installed between the side rails 14 and slides along the gap between the upper slide guide 48 and lower slide guide 50 of each side rail 14. The sliding mount plate 16 includes threaded holes 58, a wire access hole 60, two cam tabs 62 and a cam access slot 64. The cam tabs 62 extend from the sliding mount plate 16 and towards the inside surface 28 of the cover plate 12. The cam tabs 62 and cam access slot 64 are positioned along the sliding mount plate 16 to correspond with the positioning of the lock hole 36 of the cover plate 12.

The secure cover 18 includes a top plate 66 and two ends 68 extending from the top plate 66. The two ends 68 of the secure cover 18 extend downward towards the inside surface 28 of the cover plate 12. The two ends 68 of the secure cover 18 include end flanges 70 with stud mounting holes 52. The top plate 66 of the secure cover 18 includes rivet holes 54 which align with the rivet holes 54 of the top flange 46 of the side rails 14. The top plate 66 of the secure cover 18 includes a wire access hole 60. The secure cover 18 is installed by placing the stud mounting holes 52 of the end flanges 70 over some of the cover plate studs 32 and threading nuts 34 onto the cover plate studs 32. Also, rivets 72 are installed through corresponding rivet holes 54 of the top flange 46 of the side rails 14 and of the top plate 66 of the secure cover 18. The secure cover 18 is installed, such that the top plate 66 is placed over the top flanges 46 of the side rails 14 and the ends 68 of the secure cover 18 close off the open ends between the side rails 14. The secure cover 18 and the side rails 14 form a secure box around the device opening 38 of the cover plate 12 on the side of the inside surface 28 of the cover plate 12. One of the ends 68 of the secure cover 18 includes a lock tab 74 with a locking hole 76. The lock tab 74 allows for a lock cable or lock to be inserted into the locking hole 76 to further secure the device 40 in the ceiling device system.

Figure 5:
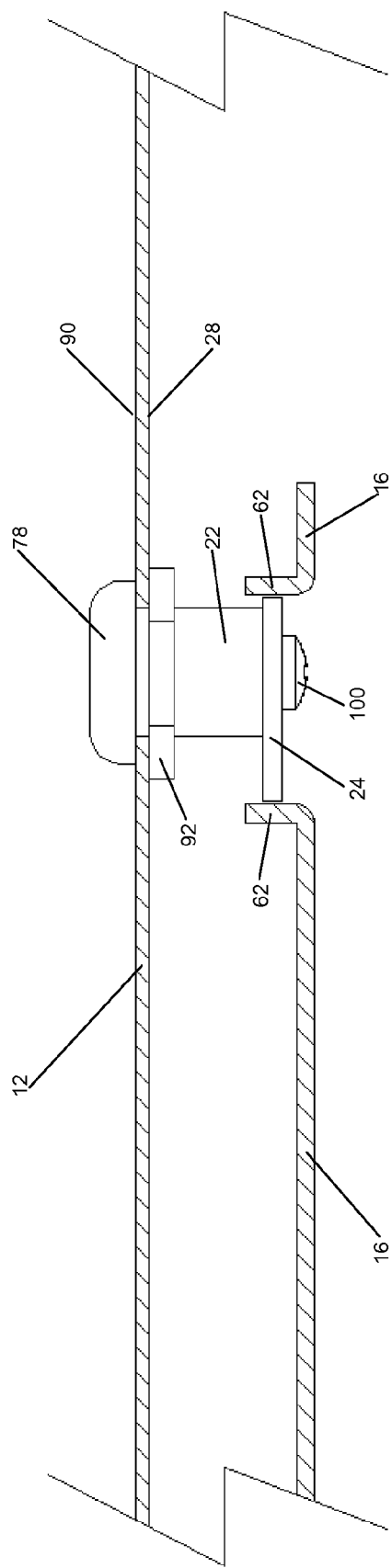
FIG. 5 is a side cross-sectional view of the ceiling device system according to the present invention.

The lock cylinder 20, body 22, cam plate 24 and cam screw 26 are shown in greater detail in FIGS. 3-4. The body 22 includes a collar 78 and an opening 80 to receive the lock cylinder 20. The lock cylinder 20 is known in the art and includes a keyed slot 82 and tumbler tabs 84, where insertion of the key 86 of FIG. 4 into the keyed slot 82 retracts the tumbler tabs 84 by a known means. The opening 80 in the body 22 includes channels 88 formed by lugs 89 to receive the tumble tabs 84. The channels 88 prevent rotation of the lock cylinder 20 in the body 22, until the tumbler tabs 84 are retracted due to insertion of the key 86. When the tumbler tabs 84 are retracted, the key 86 can be used to rotate the lock cylinder 20. The body 22 is placed in the lock hole 36 from the outside surface 90 of the cover plate 12, such that the collar 78 rests on the outside surface 90 of the cover plate 12, as shown in FIG. 5. The portion of the body 22 which extends downward from the collar 78 is usually threaded (not shown) to receive a nut 92. When the body 22 is installed, the nut 92 is tighten against the inside surface 28 of the cover plate 12 to secure the collar 78 against the outside surface 90 of the cover plate 12, as shown in FIG. 5. The lock cylinder 20 is inserted into the body 22 from the end with the collar 78 and rests on the lugs 89 in the body 22. The cam plate 24 includes a square hole 94 that fits over a square stud 96 at the bottom of the lock cylinder 20. The square stud 96 includes a cam screw hole 98 to receive the cam screw 26. The cam screw head 100 is larger than the square hole 94 and is used to secure the cam plate 24 to the lock cylinder 20. The cam plate 24 rests against the bottom of the body 22 when attached to the square stud 96 and retains the lock cylinder 20 in the body 22. The square hole 94 is offset from the center of the cam plate 24, so that the cam plate 24 travels in an oblong path as the lock cylinder 20 is rotated by the key 86. The lock cylinder 20 and body 22 are installed so that the cam plate 24 is positioned between the cam tabs 62. The key 86 and lock cylinder 20 combination shown to move the sliding mounting plate 16 can be replaced by any type of security key, whether it is mechanical or electronic, to prevent movement of the sliding mount plate 16 without the security key.

Figure 6:
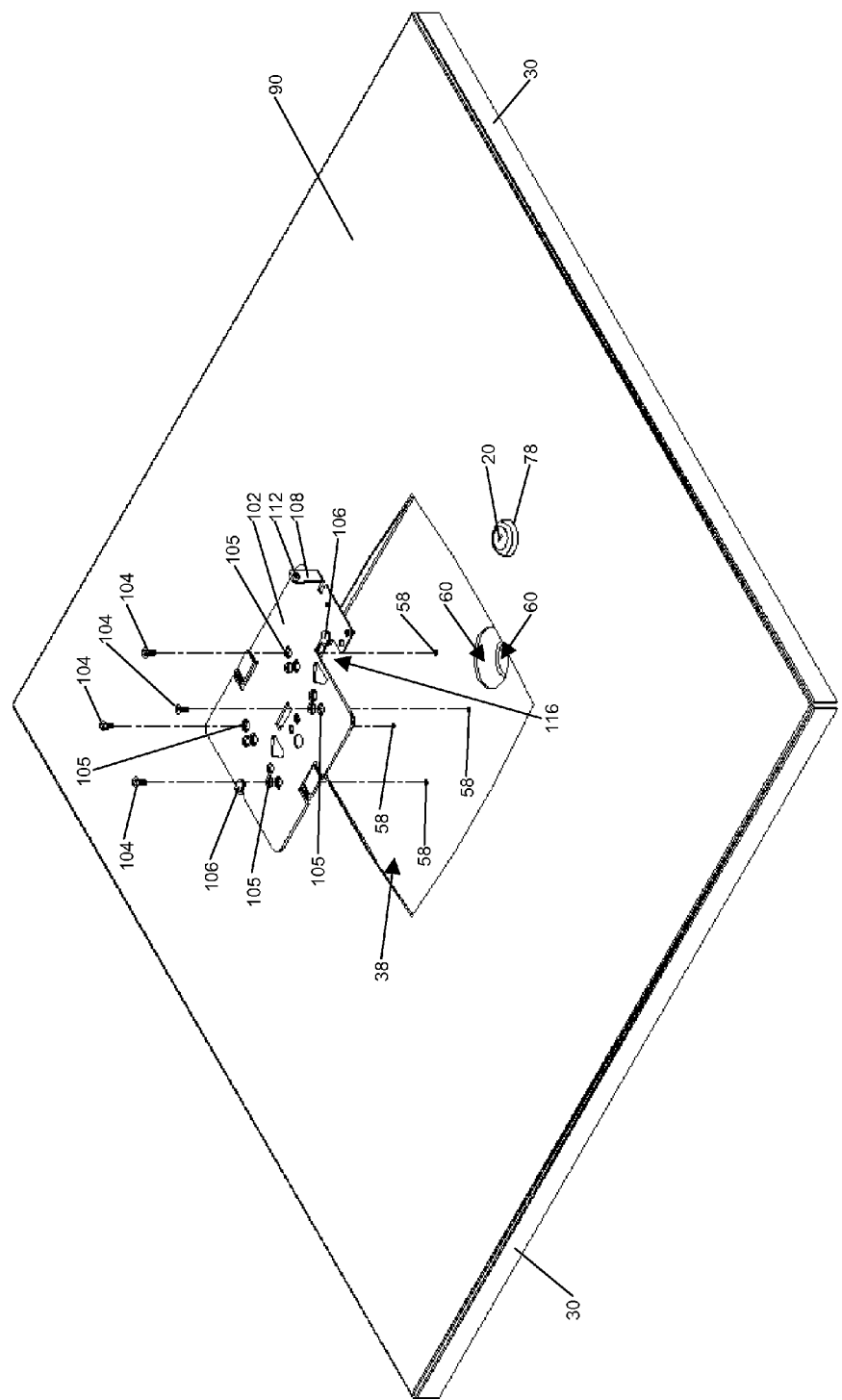
FIG. 6 is a perspective view of a ceiling device system according to the present invention.
Figure 7:
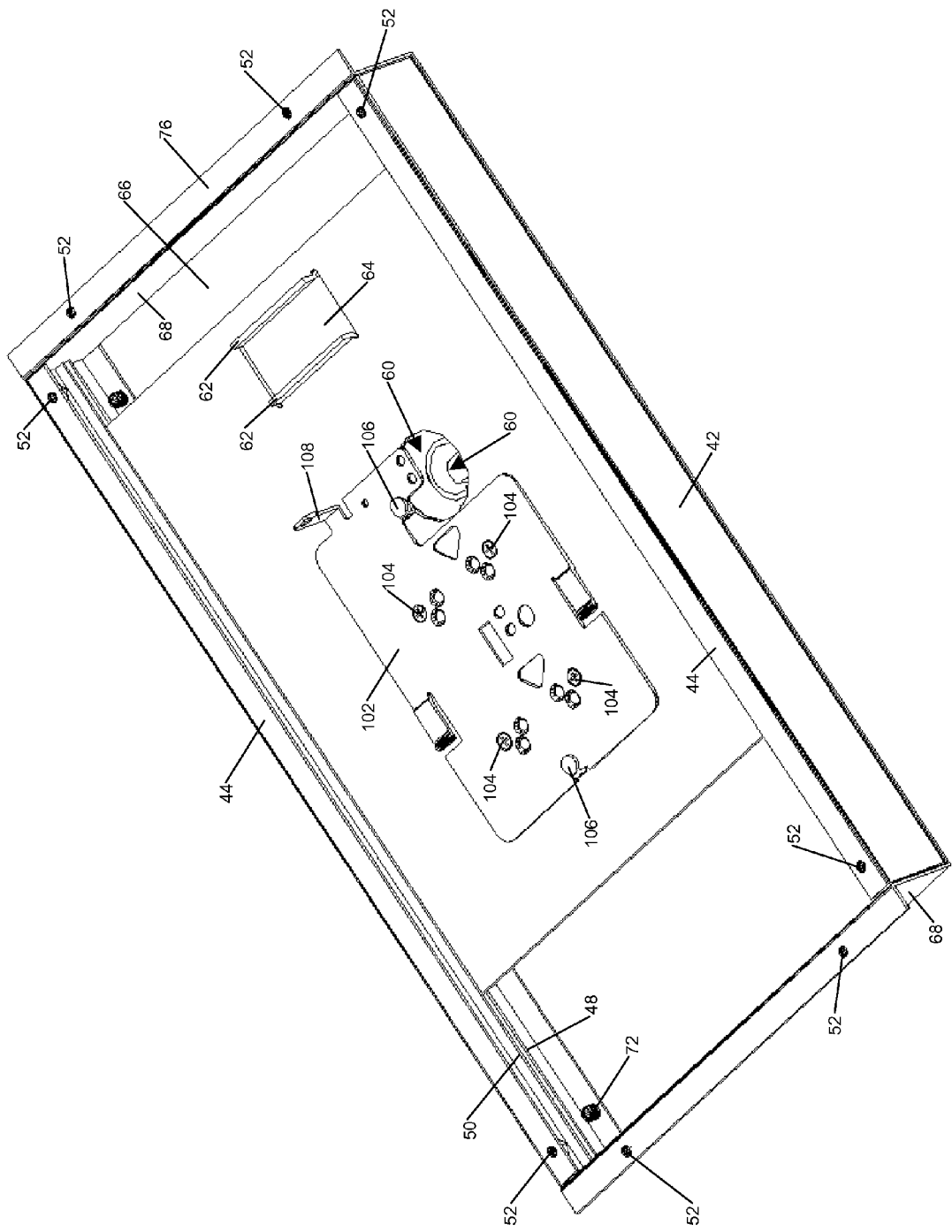
FIG. 7 is a perspective view of a ceiling device system according to the present invention.
Figure 13:
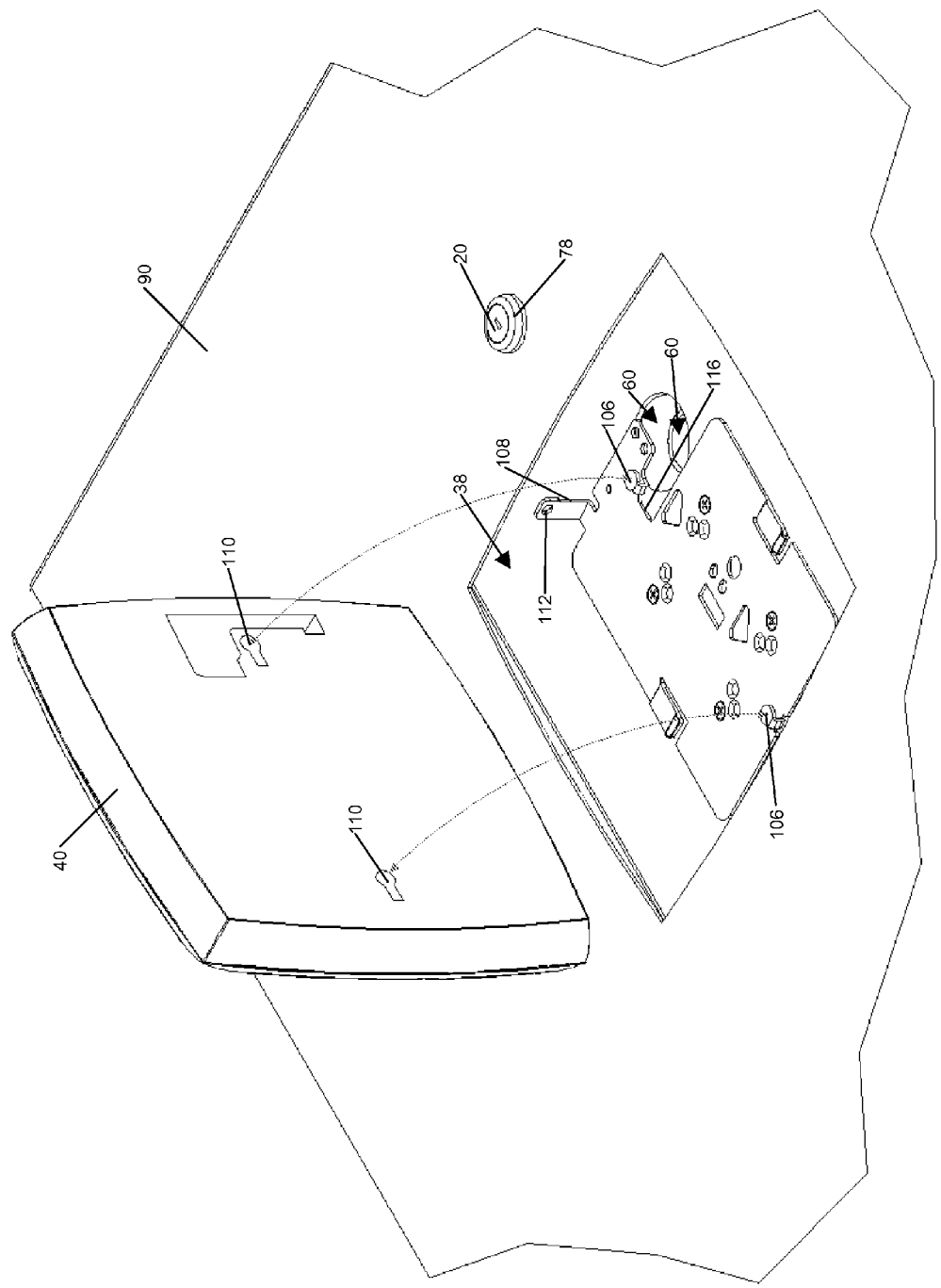
FIG. 13 is a perspective view of a ceiling device system according to the present invention.
Figure 15:
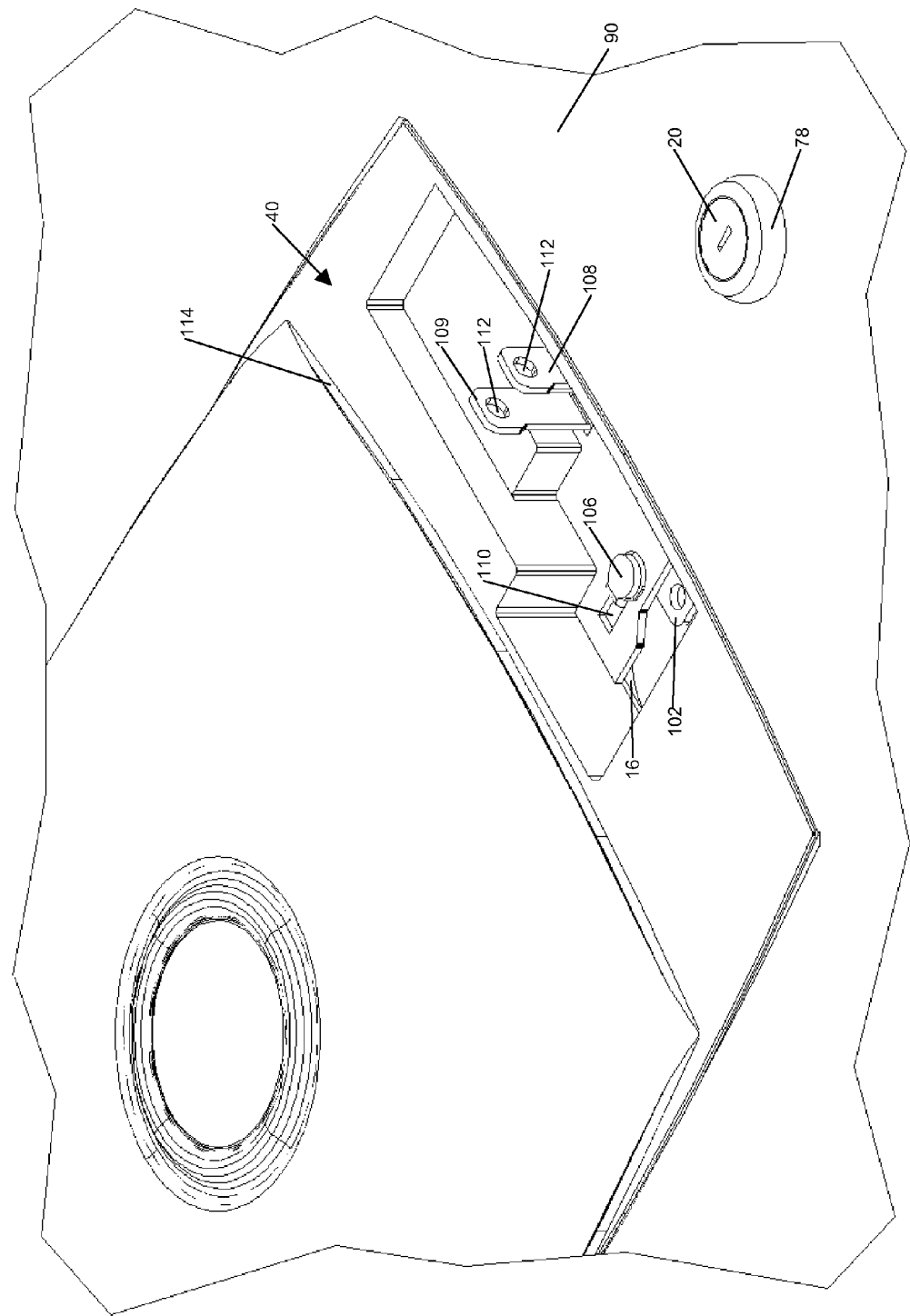
FIG. 15 is a perspective view of a ceiling device system according to the present invention.

FIGS. 6-9, 11 and 13 show a device mounting plate 102. The device mounting plate 102 is attached to the sliding mount plate 16 using screws 104, device mounting plate holes 105 and threaded holes 58, as shown in FIG. 6. The device mounting plate 102 can be installed through the device opening 38 of the cover plate 12 from the outside surface 90 of the cover plate 12. The device mounting plate 102 can be installed at any time before or after the installation of the ceiling device system 10 in a building. The device mounting plate 102 includes slide tabs 106 and a lock tab 108. The slide tabs 106 are for engaging device mounting holes 110 in the device 40 that are designed to receive a sliding tab or screw head, as shown in FIG. 13. The means of engaging the slide tabs 106 into the device 40 can be other then device mounting holes 110 in the device 40, as described, as long as there is some means attached or part of the device 40 for the slide tabs 106 to engage and hold the device 40. The lock tab 108 includes a locking hole 112 to align with a similar lock tab 108 of the device 40 for added security, as shown in FIG. 15 with the device cover 114 of the device 40 partially removed from the device 40. The device mounting plate 102 includes a wire cut out 116 to allow wire from the device 40 to feed through the wire access holes 60 of the sliding mounting plate 16 and the top plate 66 of the secure cover 18, as shown in FIG. 7.

Figure 8:
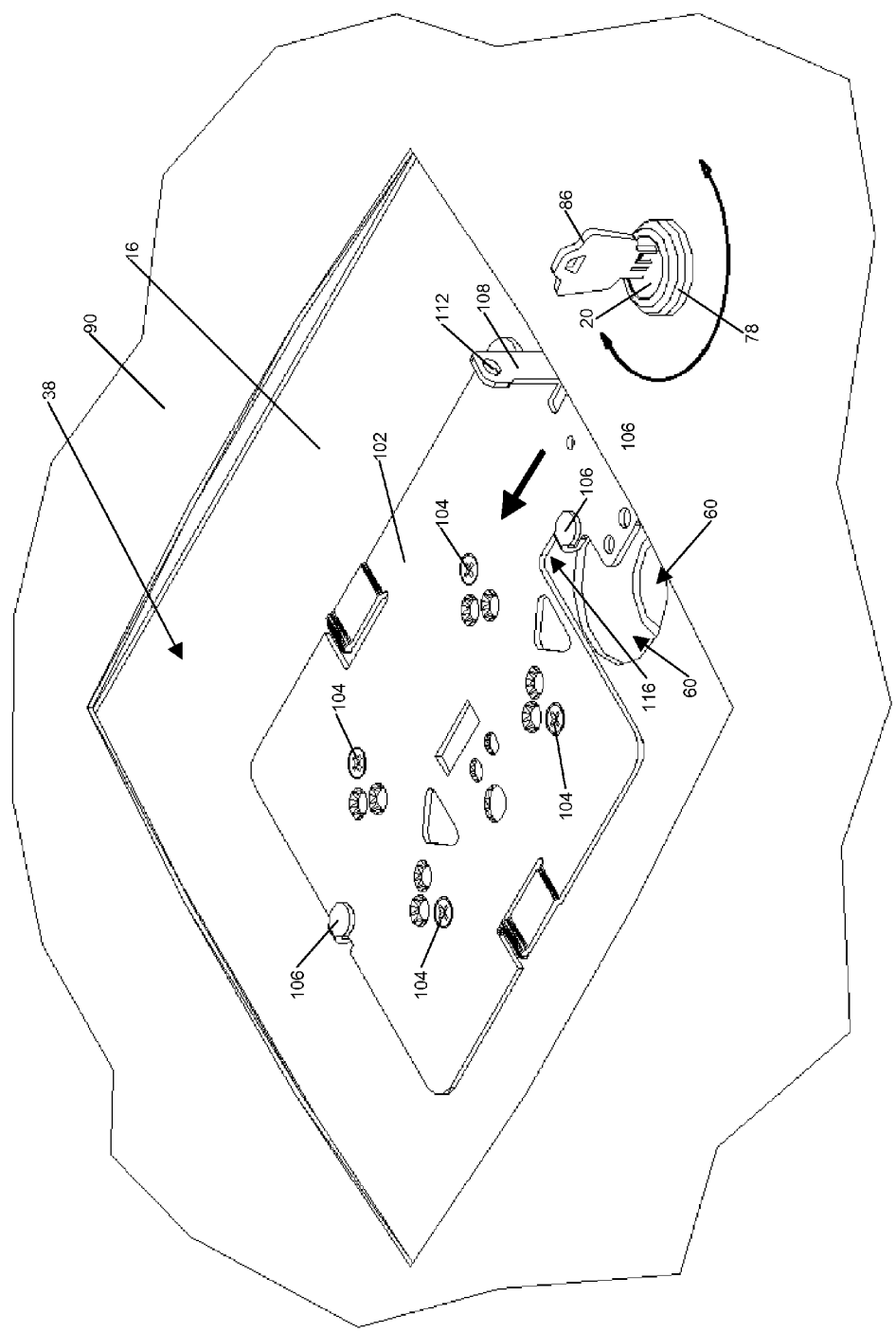
FIG. 8 is a perspective view of a ceiling device system according to the present invention.
Figure 9:
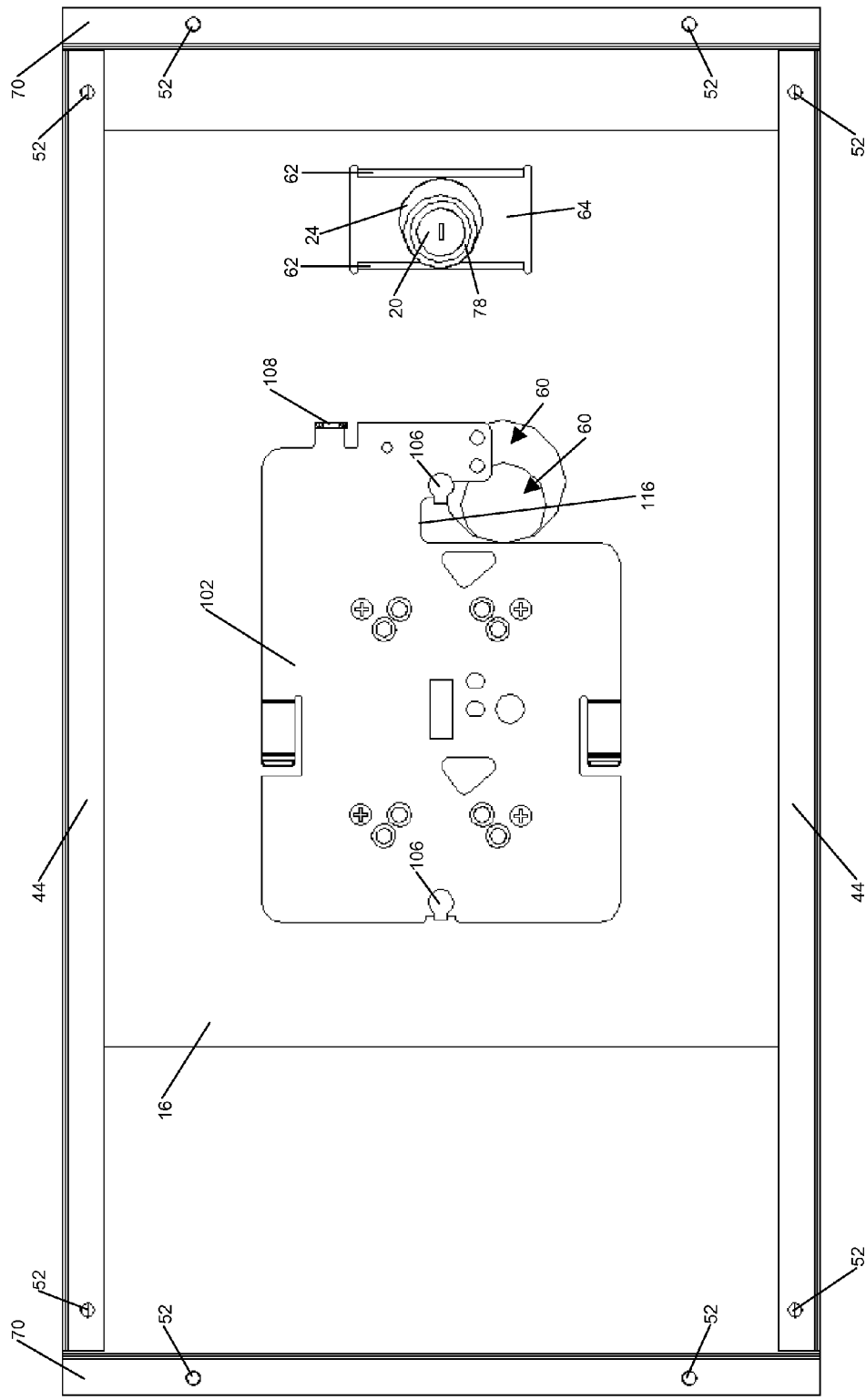
FIG. 9 is a top view of a ceiling device system according to the present invention.
Figure 10:
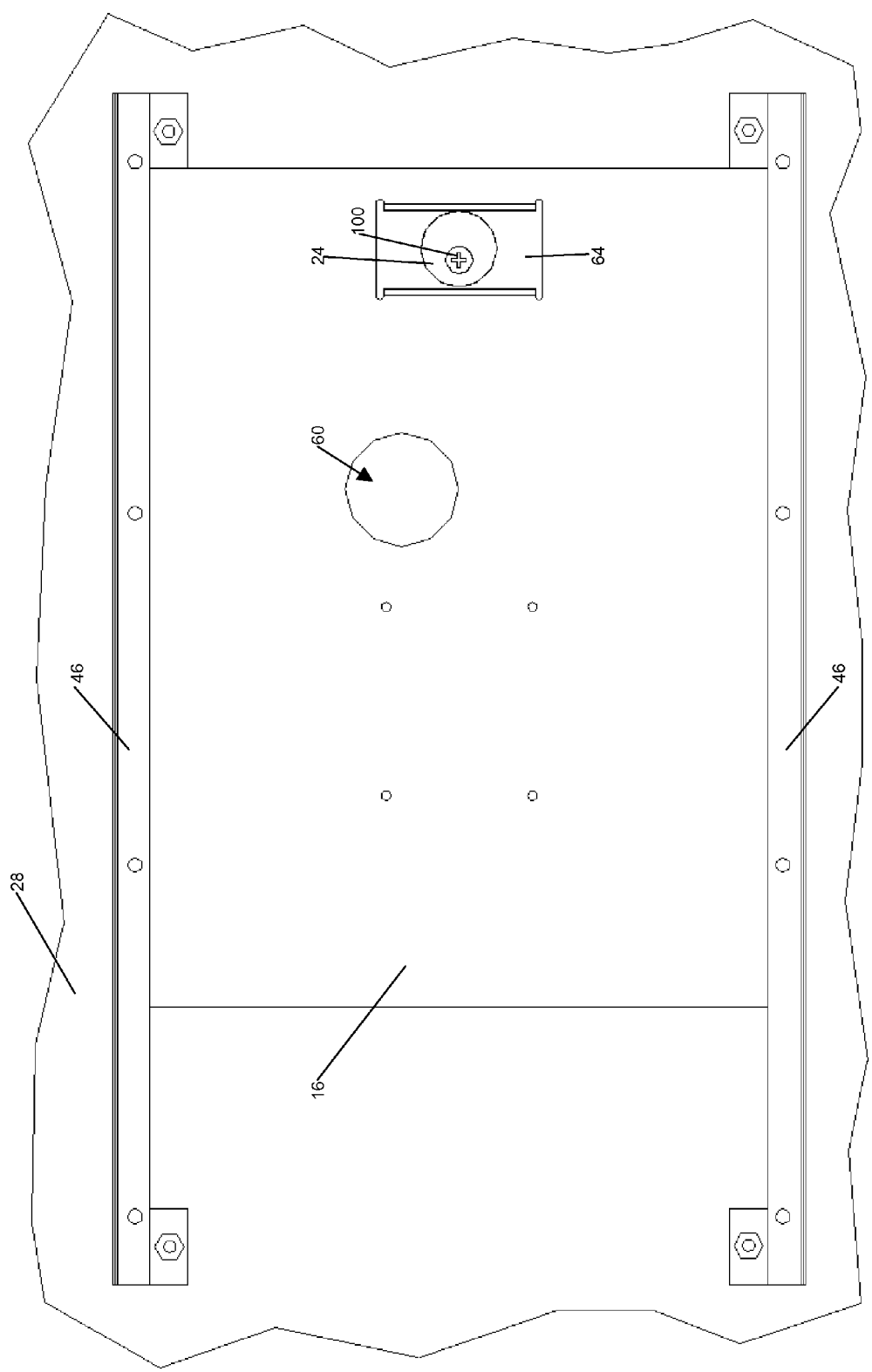
FIG. 10 is a bottom view of a ceiling device system according to the present invention.

FIG. 7 shows the ceiling device system 10 with the cover plate 12 removed and the sliding mounting plate 16 resting between the side rails 14 and movable along the upper slide guides 48 and the lower slide guides 50. FIG. 8 shows the motion of the device mounting plate 102 due to rotation of the key 86. Whereby, the rotation of the key 86 moves the sliding mounting plate 102 due to the action of the cam plate 24 against one of the cam tabs 62, as shown in FIGS. 9-12. FIG. 9 shows a top view and FIG. 10 shows a bottom view of the sliding mounting plate 16 and the cam plate 24 positions prior to rotation of the key 86 from an unlocked position to a locked position. FIGS. 9-10 show the slide tabs 106 of the device mounting plate 102 ready to initially engage the device mounting holes 110 of the device 40. The cam plate 24 in FIGS. 9-10 is positioned against the first cam tab 62, which is closest to the lock mechanism.

Figure 11:
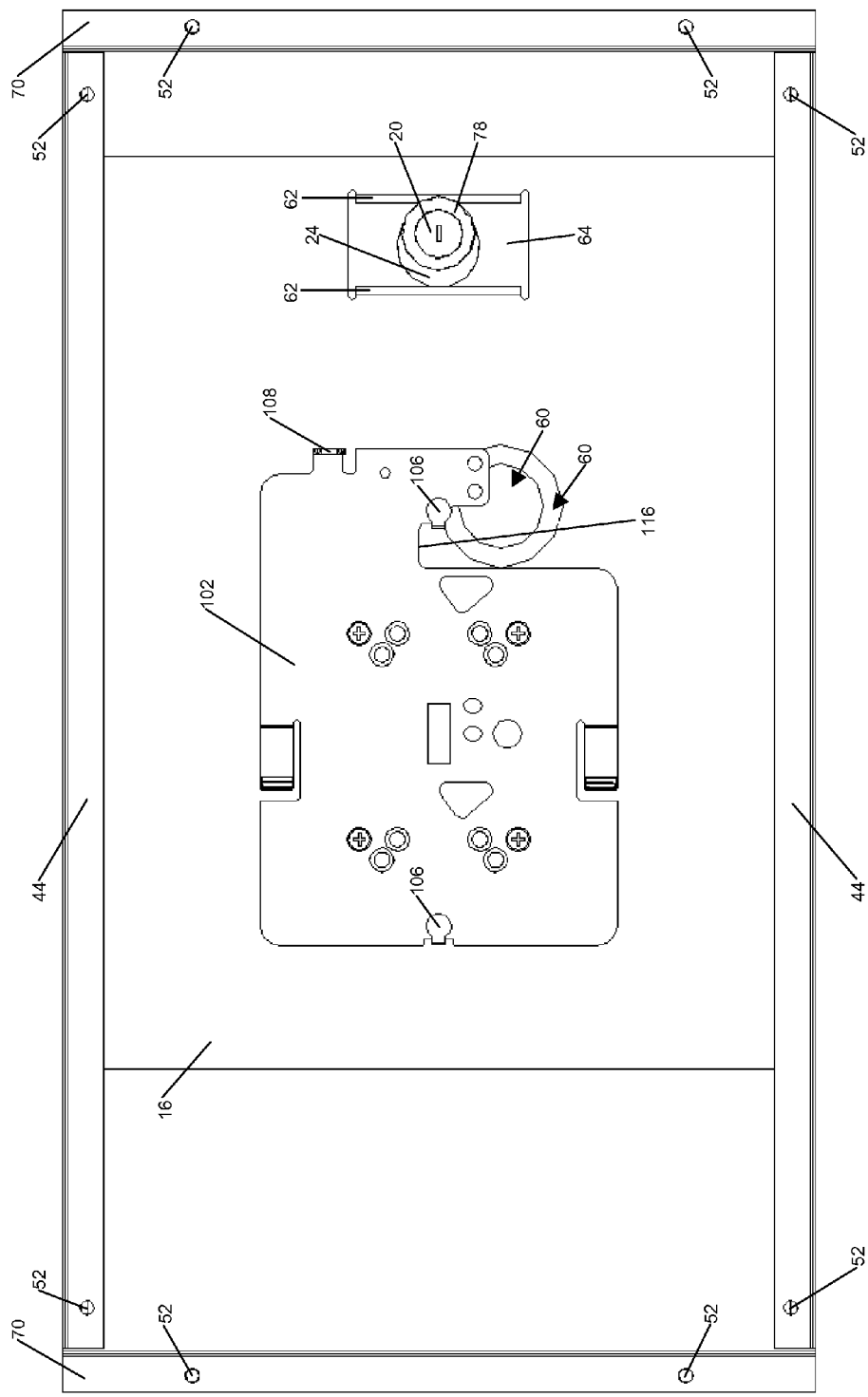
FIG. 11 is a top view of a ceiling device system according to the present invention.
Figure 12:
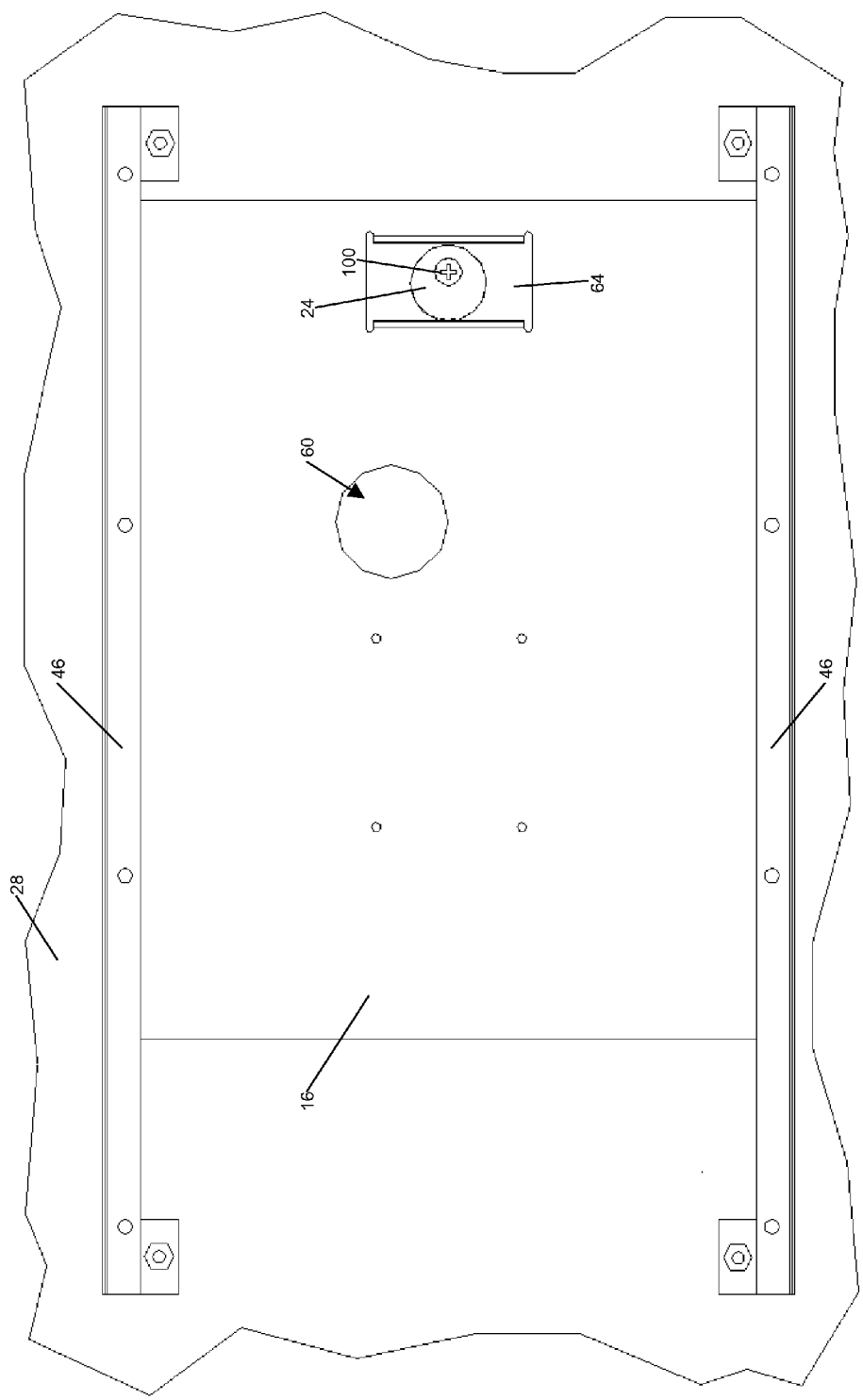
FIG. 12 is a bottom view of a ceiling device system according to the present invention.
Figure 14:
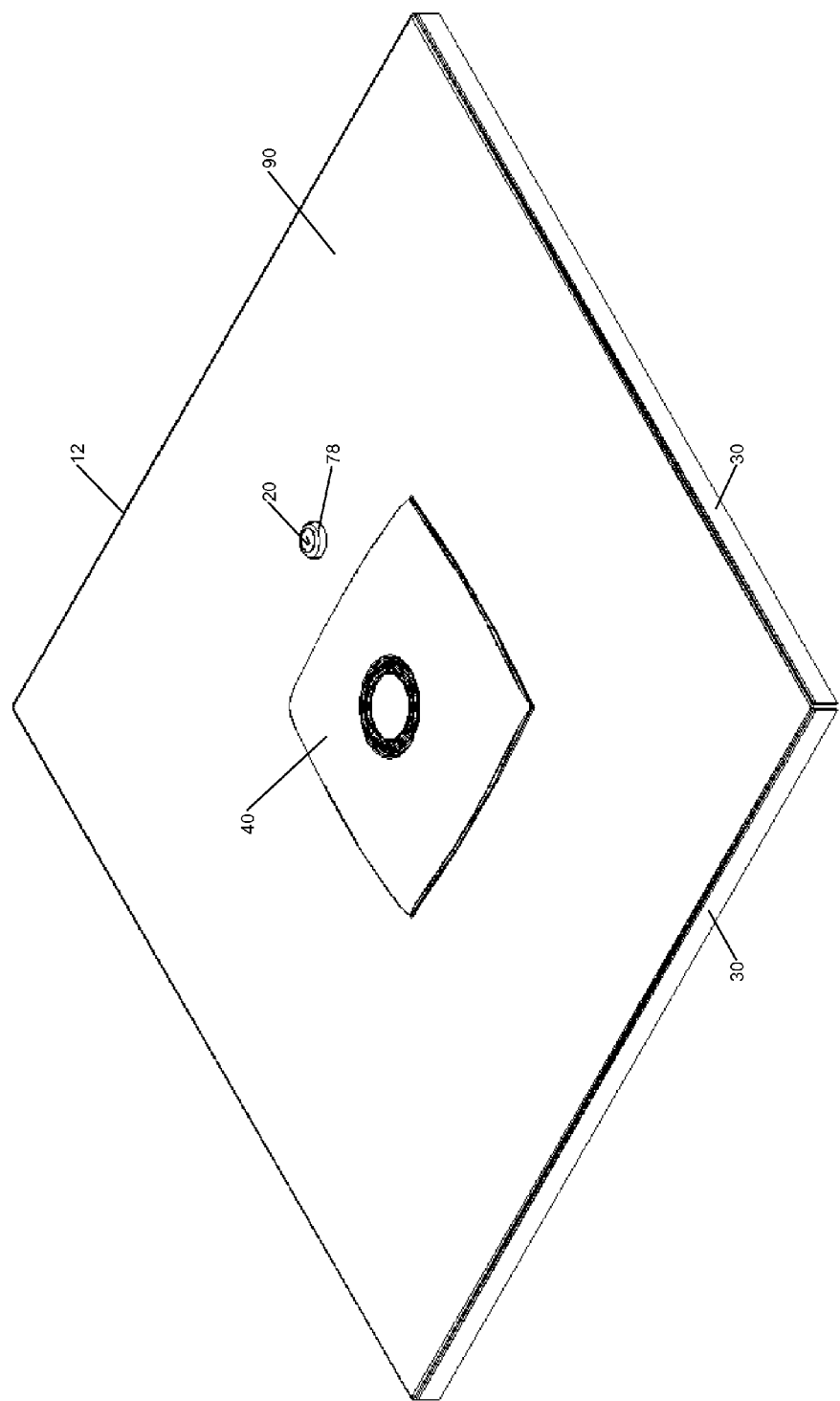
FIG. 14 is a perspective view of a ceiling device system according to the present invention.
Figure 16:
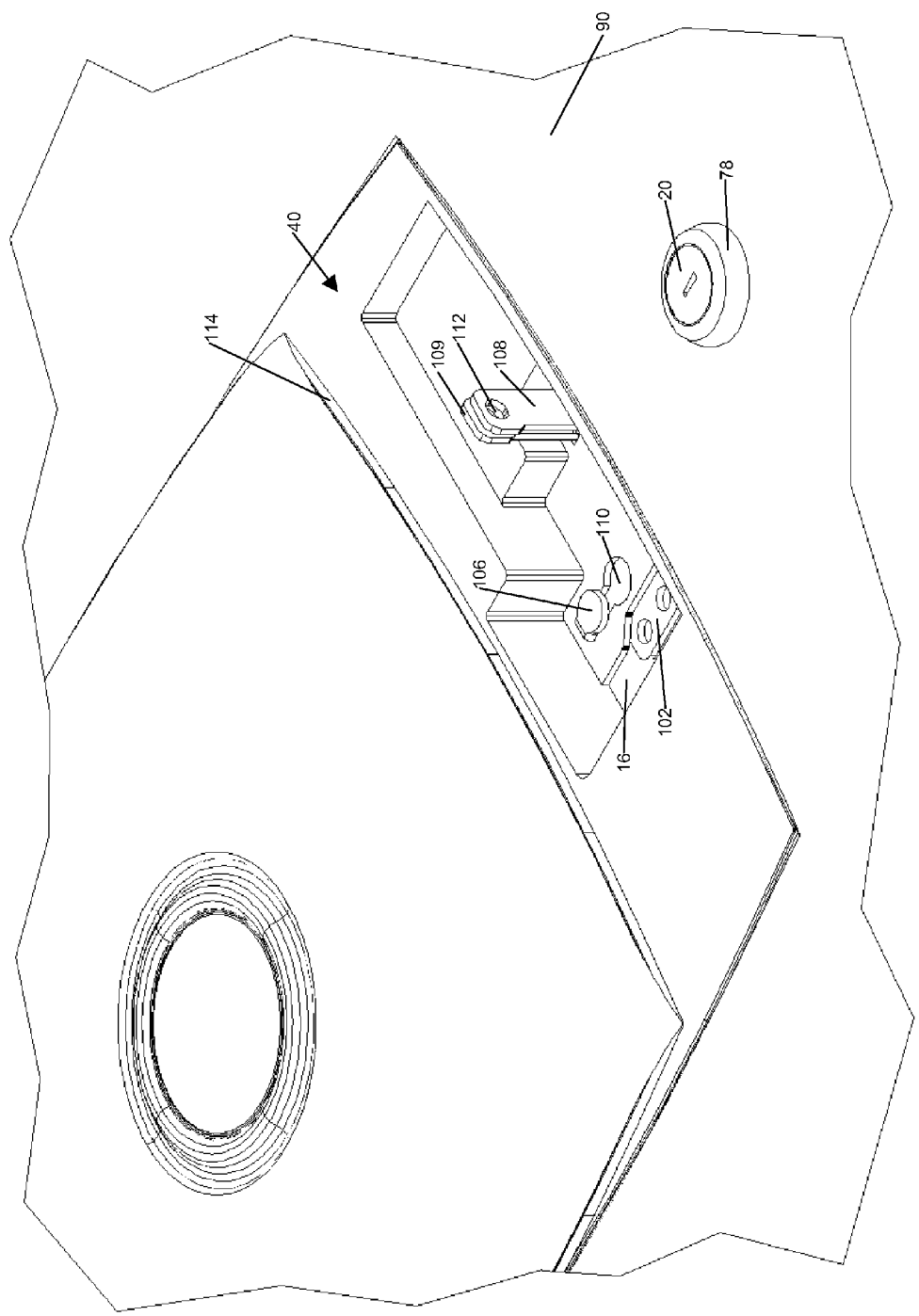
FIG. 16 is a perspective view of a ceiling device system according to the present invention.

FIG. 13 shows the device 40 positioned to be installed by placing the device 40 into the device opening 38 of the cover plate 12 and placing the device mounting holes 110 over the slide tabs 106 of the device mounting plate 102. FIG. 14 shows the device 40 in the device opening 38 of the cover plate 12. Once the device 40 is in the device opening 38, the edges of the device opening 38 prevent lateral movement of the device 40 during the process of locking the device 40 in place. FIG. 15 shows the device 40 installed in the device opening 38 as was shown in FIG. 14, but with the device cover 114 of the device 40 partially removed from the device 40. FIG. 15 shows the position of the slide tabs 106 and lock tab 108 of the device mounting plate 102 in relation to the device 40 prior to locking the device 40 in place. FIG. 11 shows a top view and FIG. 12 shows a bottom view of the sliding mounting plate 16 and the cam plate 24 positions after rotation of the key 86 from an unlocked position to a locked position. When the key 86 is rotated, the cam plate 24 rotates away from the first cam tab 62 and the cam plate 24 rotates toward and against the second cam tab 62, which is closest to the device mounting plate 102. When the cam plate 24 moves against the second cam tab 62, the cam plate 24 pushes the second cam tab 62 and pushes the sliding mounting plate 16 away from the lock mechanism. When the sliding mounting plate 16 moves to the locked position, the device mounting plate 102 moves such that the slide tabs 106 slide along and within the device mounting holes 110 of the device 40 and lock the device 40 to the device mounting plate 102. Also, the lock tab 108 of the device mounting plate 102 becomes close enough to the lock tab 109 of the device 40, so that they can be fastened together by a locking device to provide added security. FIG. 16 shows the device 40 installed in the device hole 38 as was shown in FIG. 15, but shows the position of the slide tabs 110 and lock tab 109 of the device mounting plate 102 in relation to the device 40 after locking the device 40 in place.

Figure 17:
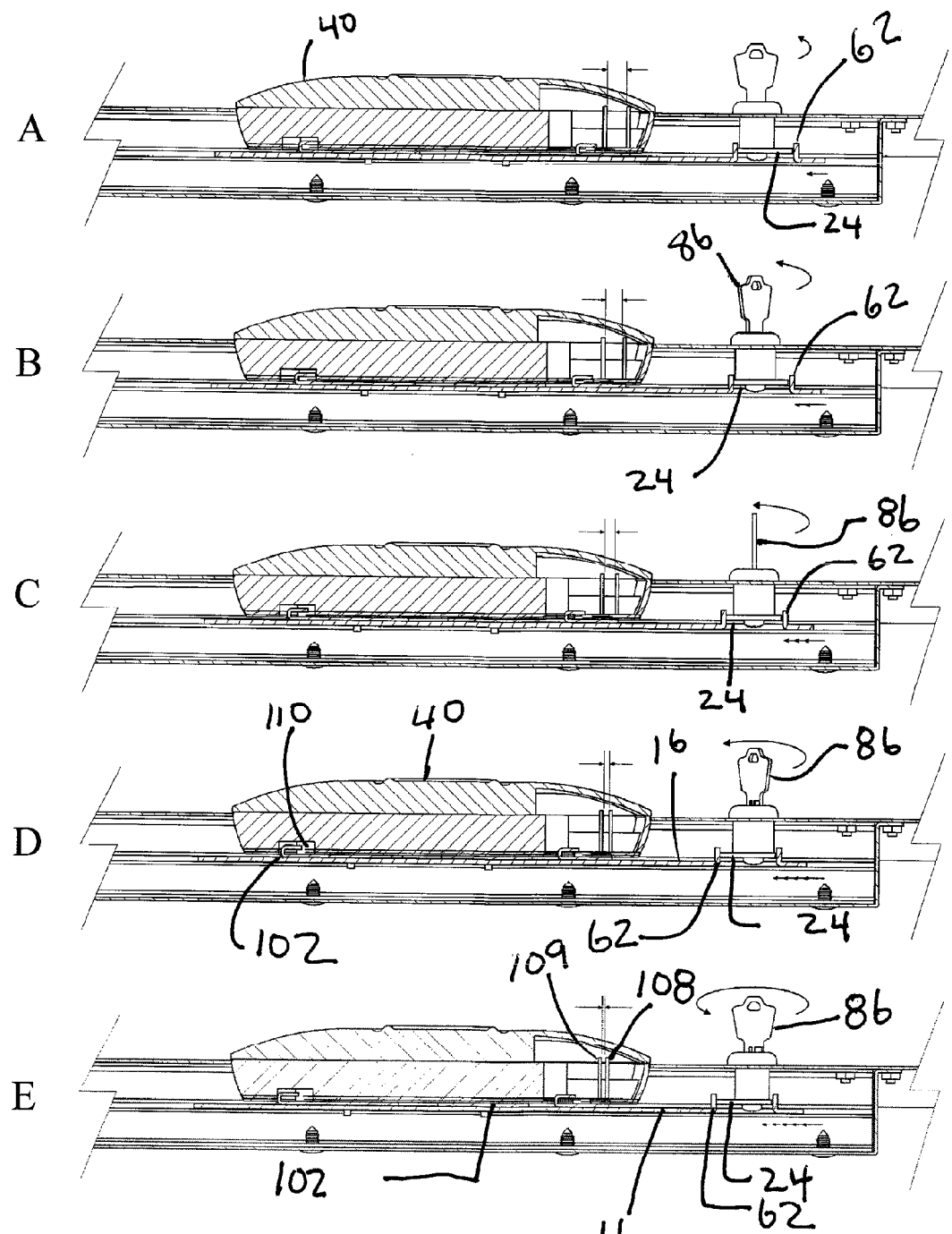
FIG. 17 is a side view of a ceiling device system according to the present invention.
Figure 18:
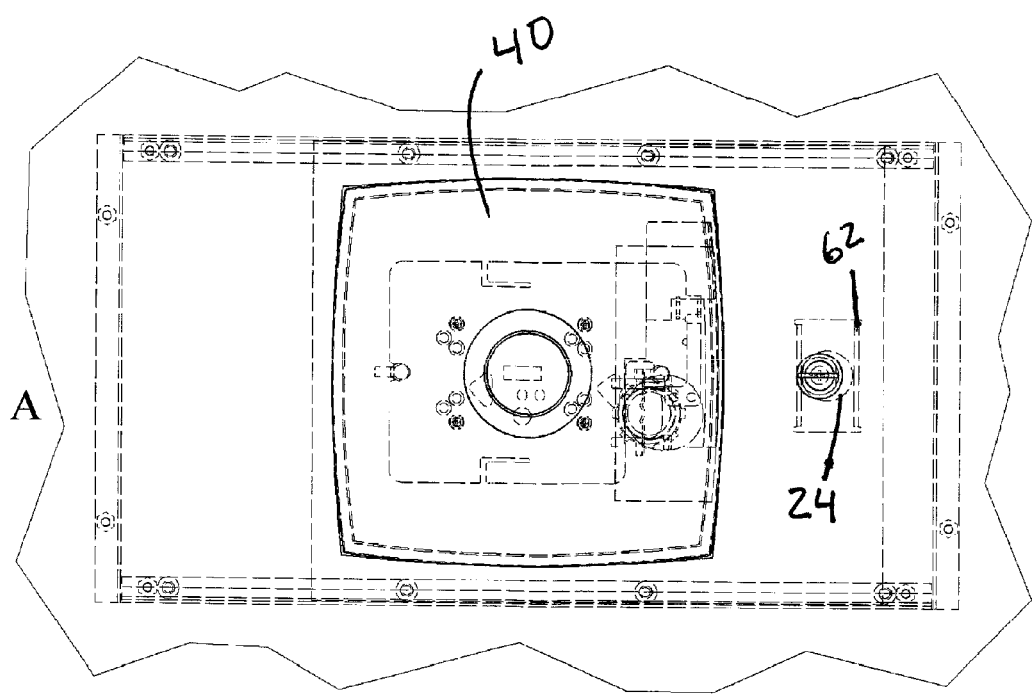
FIG. 18 is a top view of a ceiling device system according to the present invention.
Figure 19:
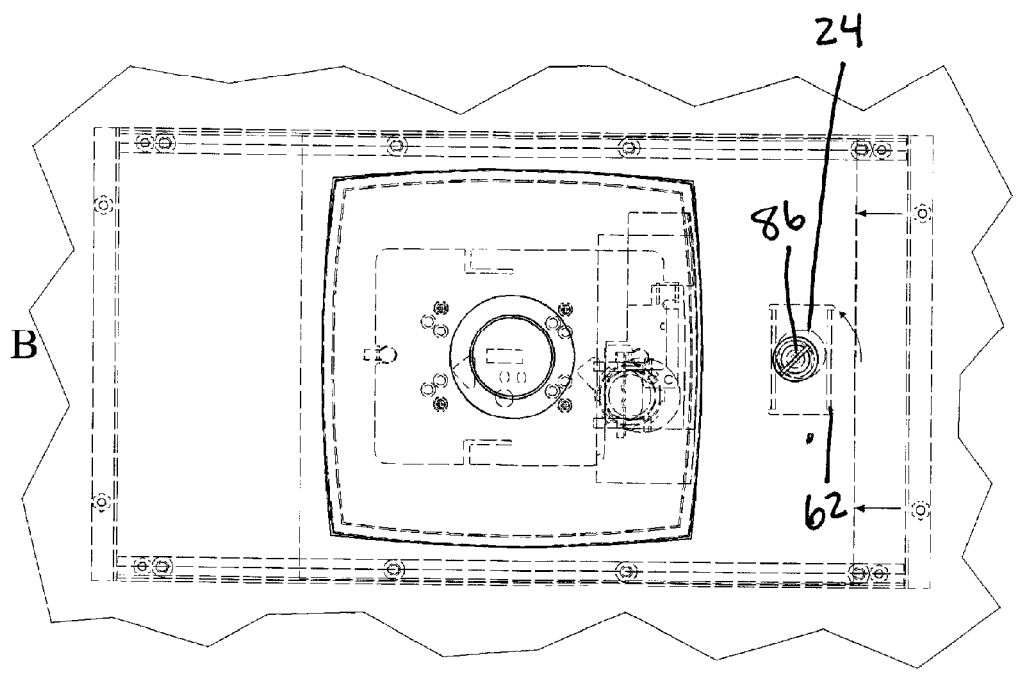
FIG. 19 is a top view of a ceiling device system according to the present invention.
Figure 20:
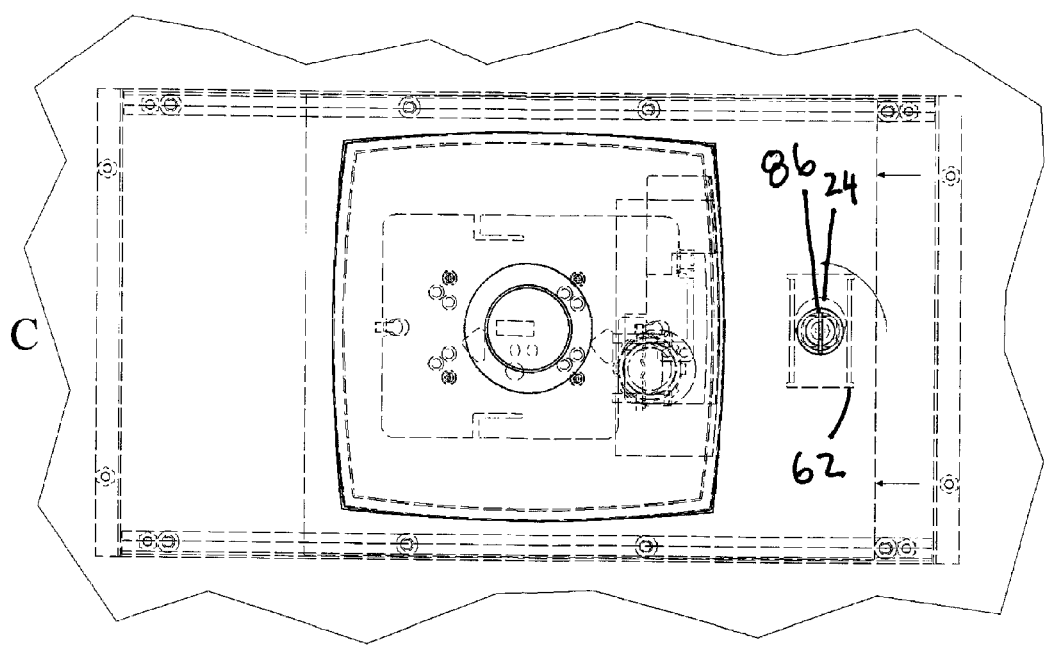
FIG. 20 is a top view of a ceiling device system according to the present invention.
Figure 21:
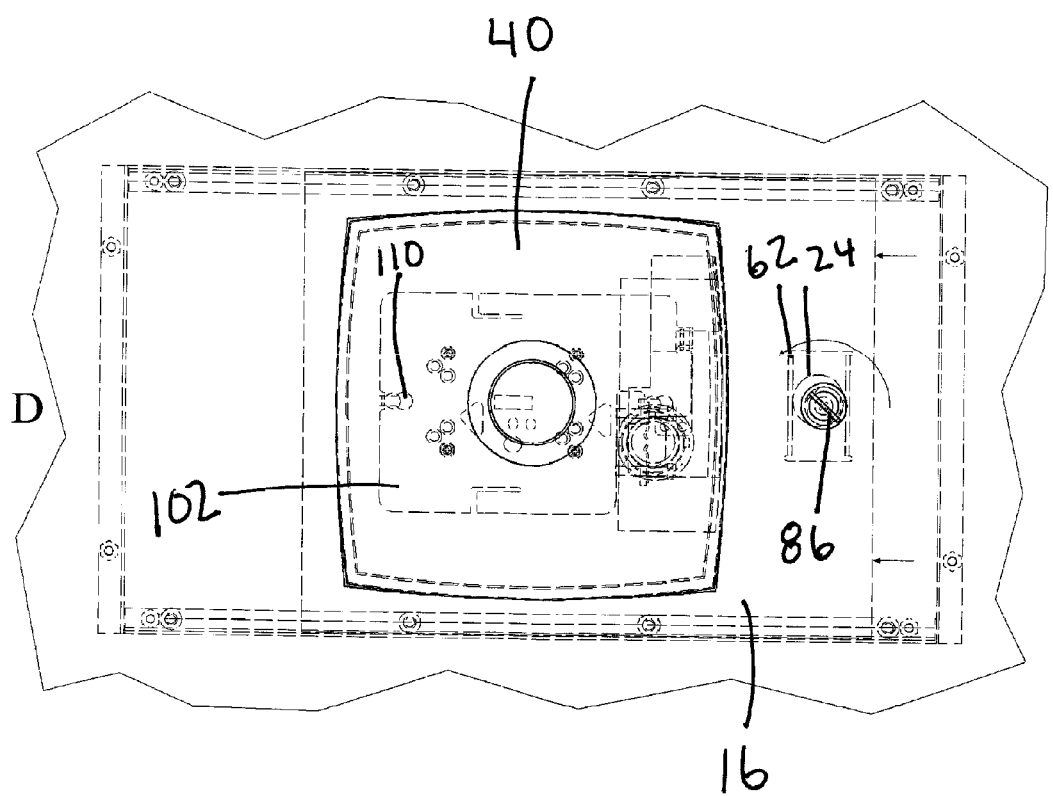
FIG. 21 is a top view of a ceiling device system according to the present invention.
Figure 22:
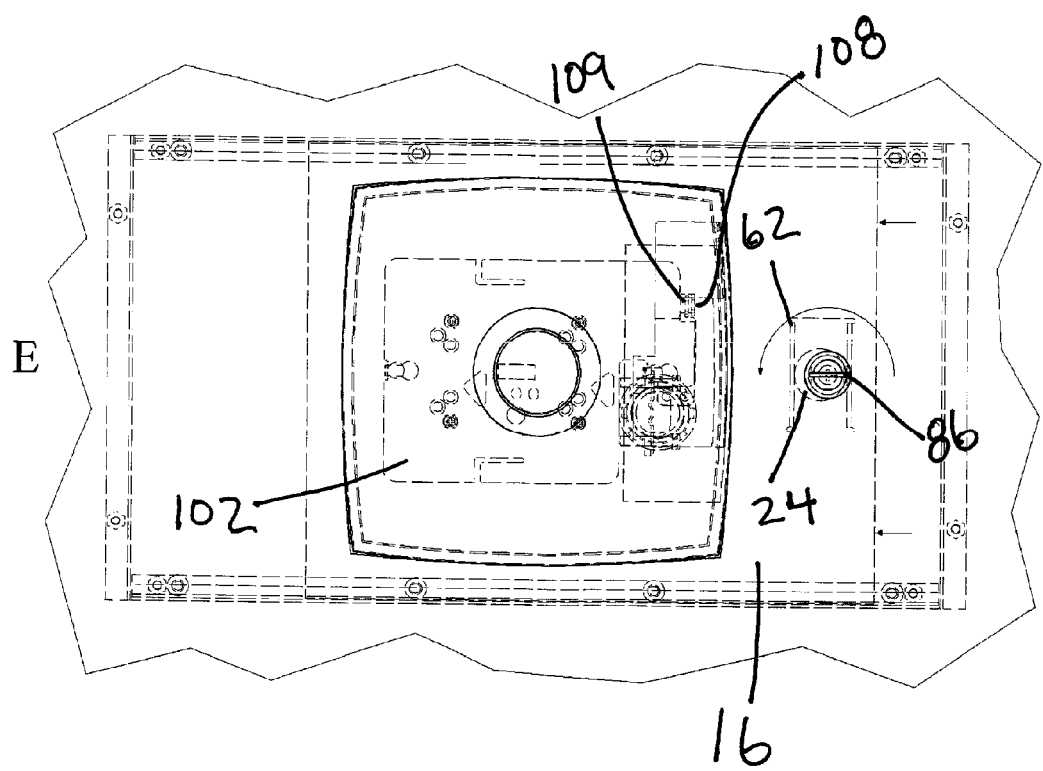
FIG. 22 is a top view of a ceiling device system according to the present invention.

FIGS. 17-22 show the operational aspects of the ceiling device system. FIG. 17 shows steps A-E of use of the ceiling device system in a cross-sectional view. FIGS. 18-22 show individual top views which correspond to the views in FIG. 17. Step A of FIG. 17 and FIG. 18 shows the device 40 after it has been placed into the device opening 38 of the cover plate 12, as is shown in FIGS. 13 and 14. Notice that the wider portion of the cam plate 24 is positioned against the first cam tab 62, which is furthest from the device opening 38. Step B of FIG. 17 and FIG. 19 shows partial rotation of the key 86, which causes partial rotation of the cam plate 24. In FIGS. 17 and 19, the partial rotation of the cam plate 24 causes the wider portion of the cam plate 24 to move away from the first cam tab 62. Step C of FIG. 17 and FIG. 20 shows 90 degree rotation of the key 86, which causes 90 degree rotation of the cam plate 24. In FIGS. 17 and 20, the 90 degree rotation of the cam plate 24 causes the wider portion of the cam plate 24 to lose contact with the first cam tab 62. Step D of FIG. 17 and FIG. 21 shows partial rotation of the key 86 between 90 and 180 degrees, which causes partial rotation of the cam plate 24 by the same amount. In FIGS. 17 and 21, the rotation of the cam plate 24 causes the wider portion of the cam plate 24 to begin contact with the second cam tab 62, which is between the device opening and the lock cylinder 20. As the cam plate 24 begins to contact the second cam tab 62, the cam plate 24 begins to push the sliding mounting plate 16 away from the lock mechanism toward the locked position. As the sliding mounting plate 16 is pushed, the device mounting plate 102 moves such that the slide tabs 106 slide along and within the device mounting holes 110 of the device 40. Step D of FIG. 17 and FIG. 22 shows 180 degree rotation of the key 86, which causes 180 degree rotation of the cam plate 24 by the same amount. In FIGS. 17 and 22, the rotation of the cam plate 24 causes the wider portion of the cam plate 24 to fully contact the second cam tab 62. At this point the cam plate 24 has pushes the sliding mounting plate 16 such that the device 40 is locked to the device mounting plate 102. Also, the lock tab 108 of the device mounting plate 102 becomes close enough to the lock tab 109 of the device 40, so that they can be fastened together by a locking device to provide added security.

While different embodiments of the invention have been described in detail herein, it will be appreciated by those skilled in the art that various modifications and alternatives to the embodiments could be developed in light of the overall teachings of the disclosure. Different embodiments can include different ways to form a secure box that includes a sliding mount plate on the inside surface of the cover plate. There can be different forms of locks to move the sliding mount plate. There can be different shaped device openings and device mounting plates to accommodate differences in devices to be mounted to the secured ceiling device system. Accordingly, the particular arrangements are illustrative only and are not limiting as to the scope of the invention that is to be given the full breadth of any and all equivalents thereof.

We claim:

1. A ceiling device system for securing a device in a ceiling, comprising:
   a cover plate to simulate a ceiling and is adapted to be installed in a ceiling, said cover plate including a device opening adapted to receive the device, said cover plate having an outside surface and an inside surface;
   a sliding mechanism mounted on said inside surface of said cover plate, said sliding mechanism including a sliding component which is allowed to move within an area about said device opening of said cover plate,
   a lock mechanism connected to said sliding component, said lock mechanism connected such that movement of said lock mechanism moves said sliding component within said area about said device opening of said cover plate; and
   a device mounting plate with slide tabs adapted to engage the device and mounted to said sliding component of said sliding mechanism, said slide tabs being shaped and adapted to slide within the device to lock the device in said device opening of said cover plate due to movement of said sliding component of said sliding mechanism by movement of said lock mechanism.

2. The ceiling device system of claim 1, wherein said cover plate simulates a ceiling tile used in a suspended ceiling systems.

3. The ceiling device system of claim 1, further including a secure box mounted to said inside surface of said cover plate and over said sliding mechanism to prevent tampering of said sliding mechanism.

4. The ceiling device system of claim 1, further including a lock tab on said device mounting plate adapted to be fastened to a lock tab of the device.

5. The ceiling device system of claim 1, wherein said lock mechanism requires a security key to operate said lock mechanism.

6. The ceiling device system of claim 1, wherein said sliding mechanism includes two side rails attached to said cover plate and wherein said side rails each include slide guides to retain said sliding component and provide a path of travel for said sliding component.

7. The ceiling device system of claim 6, wherein said sliding component is a plate which slides along said slide guides.

8. The ceiling device system of claim 6, further including a secure box mounted to said inside surface of said cover plate and over said sliding mechanism to prevent tampering of said sliding mechanism.

9. The ceiling device system of claim 6, wherein each of said side rails includes a side, bottom flange, top flange, upper slide guide and lower slide guide; wherein said bottom flange extends from said side and mounts to said cover plate; wherein said top flange extends from said side; and wherein said upper slide guide and lower slide guide extend from said side and are parallel to each other, and said upper slide guide and said lower slide guide being spaced apart just enough to allow the sliding component to slide between said upper slide guide and said lower slide guide.

10. The ceiling device system of claim 9, further including a secure cover mounted over said two side rails and said sliding component to secure such.

11. The ceiling device system of claim 10, wherein said sliding component is a plate which slides along said slide guides.

12. The ceiling device system of claim 1, wherein said lock mechanism includes a cam plate which rotates due to operation of said lock mechanism and wherein said sliding component includes cam tabs located such that said cam plate can contact any of said cam tabs and move said sliding component within said area about said device opening of said cover plate and hence move said device mounting plate in relation to the device.

13. The ceiling device system of claim 6, wherein said lock mechanism includes a cam plate which rotates due to operation of said lock mechanism and wherein said sliding component includes cam tabs located such that said cam plate can contact any of said cam tabs and move said sliding component within said area about said device opening of said cover plate and hence move said device mounting plate in relation to the device.

14. The ceiling device system of claim 7, wherein said lock mechanism includes a cam plate which rotates due to operation of said lock mechanism and wherein said plate includes cam tabs located such that said cam plate can contact any of said cam tabs and move said plate within said area about said device opening of said cover plate and hence move device mounting plate in relation to the device.

15. The ceiling device system of claim 9, wherein said lock mechanism includes a cam plate which rotates due to operation of said lock mechanism and wherein said sliding component includes cam tabs located such that said cam plate can contact any of said cam tabs and move said sliding component within said area about said device opening of said cover plate and hence move said device mounting plate in relation to the device.

16. The ceiling device system of claim 11, wherein said lock mechanism includes a cam plate which rotates due to operation of said lock mechanism and wherein said plate includes cam tabs located such that said cam plate can contact any of said cam tabs and move said plate within said area about said device opening of said cover plate and hence move said device mounting plate in relation to the device.

17. The ceiling device system of claim 13, further including a secure cover mounted over said two side rails and said sliding component to secure such.

18. The ceiling device system of claim 14, further including a secure cover mounted over said two side rails and said sliding component to secure such.

19. The ceiling device system of claim 15, further including a secure cover mounted over said two side rails and said sliding component to secure such.

20. The ceiling device system of claim 16, further including a secure cover mounted over said two side rails and said sliding component to secure such.

21. A ceiling device system for securing a device in a ceiling, comprising:
a cover plate to simulate a ceiling and is adapted to be installed in a ceiling, said cover plate including a device opening adapted to receive the device, said cover plate having an outside surface and an inside surface;
a device mounting plate adapted to engage the device and hold the device within said device opening, such that the device is disposed within the walls of said device opening;
a sliding mechanism having a section mounted on said inside surface of said cover plate and a section mounted to said device mounting plate, said sliding mechanism to receive and hold said device mounting plate, said section of said sliding mechanism mounted to said cover plate large enough to allow said device mounting plate to move within an area about said device opening of said cover plate; and
a lock mechanism connected to said cover plate, said lock mechanism connected such that movement of said lock mechanism engages and holds in place said device mounting plate.

22. The ceiling device system of claim 21, wherein said cover plate simulates a ceiling tile used in a suspended ceiling systems.

* * * * *